Figure 1:
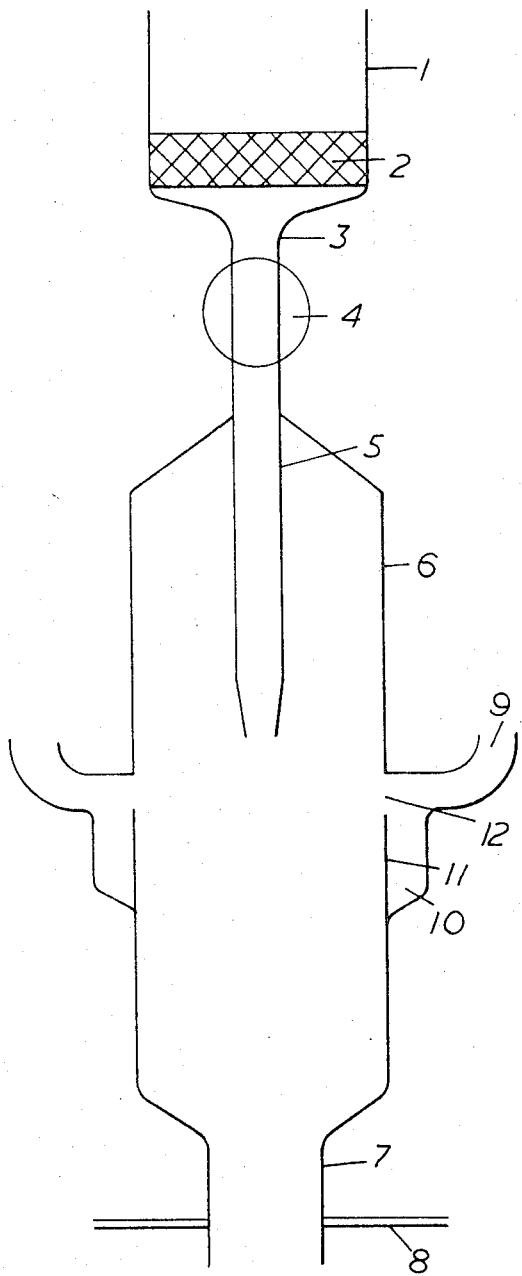

United States Patent

[11] 3,572,673

[72] Inventor Albert Bryan Houghton
    Runcorn, England
[21] Appl. No. 845,622
[22] Filed July 3, 1969
[45] Patented Mar. 30, 1971
[73] Assignee Imperial Chemical Industries Limited
    London, England
    Continuation of application Ser. No.
    500,069, Oct. 21, 1965, now abandoned.

[54] APPARATUS FOR DISSOLVING ALKALI METALS
    1 Claim, 2 Drawing Figs.
[52] U.S. Cl. ............................................. 266/34,
    222/145
[51] Int. Cl. ............................................. C21c 7/00
[50] Field of Search ................................. 266/34, 9;
    75/103, 45, 46; 222/145

[56] References Cited
    UNITED STATES PATENTS
    3,067,025  12/1962  Chisholm ............... 266/9X
    3,292,914  12/1966  Southam ............... 266/9

Primary Examiner—J. Spencer Overholser
Assistant Examiner—John E. Roethel
Attorney—Cushman, Darby & Cushman ABSTRACT: Apparatus for dissolving molten solids in solvent liquids. The invention, which is especially useful for dissolving alkali metal in liquid ammonia, includes an inlet device for feeding the molten material into a dissolver vessel, the device comprising a feed pipe having means for irrigating the pipe's internal walls with a solvent liquid. The process involves dissolving the molten material by feeding the same to the dissolver vessel through the inlet device while the latter is irrigated with the solvent.

APPARATUS FOR DISSOLVING ALKALI METALS

This application is a continuation of Ser. No. 500,069, filed Oct. 21, 1965, now abandoned.

This invention relates to an improved method and apparatus for dissolving molten solids in solvent liquids and especially for dissolving alkali metals in liquid ammonia.

It is well known that alkali metals dissolve in liquid ammonia to form solutions from which the metal can be recovered by evaporation. It is normal practice to prepare such solutions by adding lumps of the metal to liquid ammonia, first taking care to remove any crust of oxide or other reaction products from the surface of the active metal in order to avoid contamination of the resulting solutions. In order to overcome the inconvenience which this technique causes in large scale operations, the alkali metal can be melted and filtered in order to remove oxides and other solid impurities. This necessitates very careful handling of the molten metal, however, and also introduces the further difficulty that splashing can easily take place while the molten metal is added to the solvent and result in blockage of the inlet due to localized solidification of metal or evaporation of the solvent. Similar difficulties can be encountered when preparing solutions of other molten materials.

We have now found that this difficulty can be overcome by adding the molten material to the solvent through an inlet pipe provided with means for irrigating the internal walls thereof with liquid solvent in order to keep them free from deposits of solidifying or congealing material which could cause blockage.

Thus according to our invention we provide an improved process for dissolving a molten material in a solvent liquid which comprises introducing the molten material into a dissolver vessel through an inlet pipe provided with means for irrigation of its internal walls with the solvent liquid.

The molten material may be any liquefied material which has a tendency to solidify or congeal, and the solvent liquid may be selected appropriately for the particular molten material employed.

Our invention is primarily intended to deal with the problem of preparing solutions of alkali metals, for example sodium, potassium or mixtures thereof, but can also be useful for dissolving any other molten solid or congealing liquid in a solvent without risk of blockage of the feed of material. When using an alkali metal, the solvent most usefully employed is one which dissolves the alkali metal to give colored solutions which retain the properties of the metal, i.e. physically dissolves the metal; solvents which dissolve the metal by chemical reaction (e.g. an alcohol or water) tend to do so too vigorously to be used unless adequate means can be provided for the removal of the head and/or gas evolved. The preferred solvent is liquid ammonia, though others which also have the property of dissolving alkali metals may be used, for example liquid amines such as methylamines.

According to our invention we also provide an inlet device, useful for our process described above, which comprises a feed pipe provided with means for irrigation of its internal walls with a liquid.

Most conveniently the required irrigation of the inlet pipe can be secured by providing the inlet pipe with a weir device which is fed with liquid solvent and which allows the solvent flowing over the weir to form the falling film down the inner surface of the inlet pipe. The molten material is then injected or allowed to run in by gravity as a stream or jet down the center of the pipe. By directing the stream of molten material so that it does not impinge on the wall of the inlet pipe, the main body of it will not come into contact with the solvent until it reaches the dissolver vessel. Any small amount of molten material either splashing directly on to the sides of the inlet pipe or splashing back from the solution vessel in the form of a solution, will be washed rapidly down into the dissolver vessel and thus any blockage will be prevented.

Apart from this feature of the irrigated inlet pipe the remainder of the apparatus can be of conventional design. Thus in the case of molten sodium, conventional means for filtration can be conveniently employed to remove solid impurities from the molten metal before it is fed into the dissolver vessel.

Figure 2:
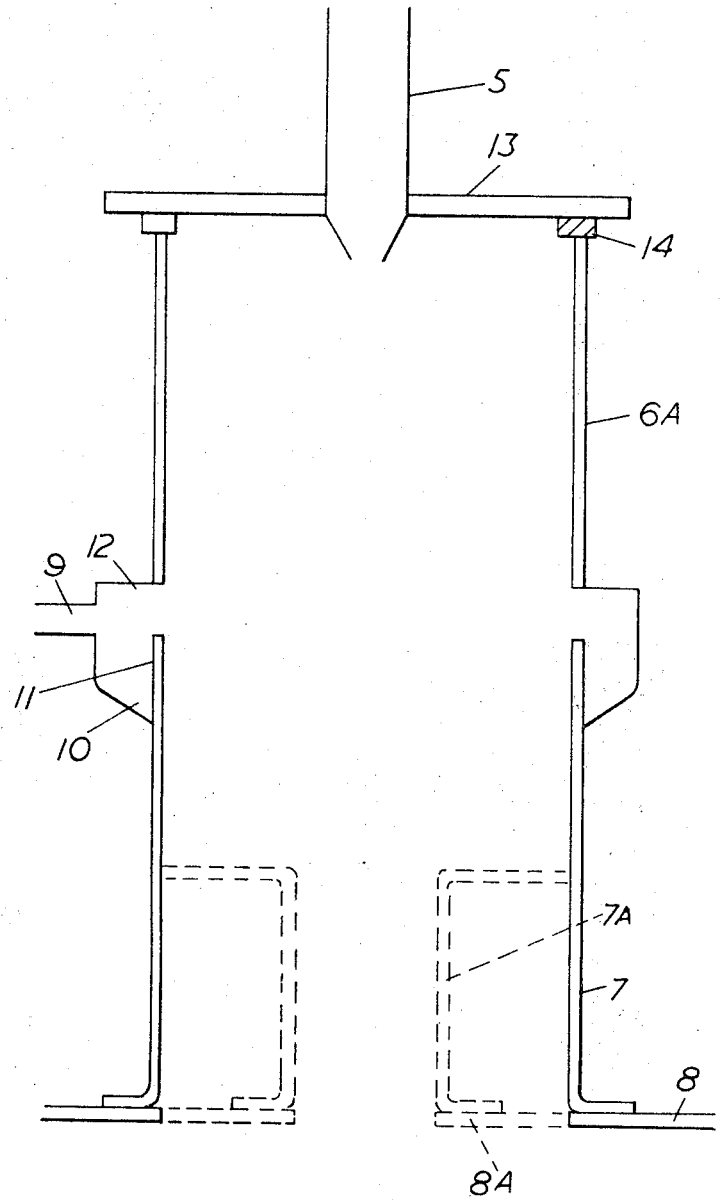

The invention is illustrated but not limited by the accompanying drawings in which FIGS. 1 and 2 represent views in vertical section through feeding devices according to our invention. The description given relates to the use of these devices for producing a solution of sodium in liquid ammonia.

In FIG. 1 a vessel 1 is provided with a filter bed 2 and a runoff pipe 3 connected through a valve 4 to a further length of pipe 5. The pipe 5 passes into the upper end of a second vessel 6 which at its lower end 7 is constricted slightly and passes through the reaction or dissolver vessel wall 8. Part of the way down the wall of vessel 6, are fitted one or more feed pipes 9 which lead into a cavity or reservoir chamber 10 of annular form surrounding the vessel 6 and separated from the space inside vessel 6 by a wall 11. An annular opening, or series of openings, 12 disposed around the vessel 6 provides communication between cavity 10 and the main space inside vessel 6.

In use sodium is fed into vessel 1 in molten form or is fed in solid form and melted by heating means (not shown). The heating means may be for example a heating coil surrounding vessel 1, and heat may be applied, and the vessel lagged, as may be necessary to prevent solidification of the molten metal. The molten metal is then filtered by passage through the filter bed 2, which may be made up for example of steel wool, and flows out through pipes 3 and 5 under the control of valve 4. The pipe 5 is arranged so that the stream of liquid metal emerging from its lower end is substantially aligned with pipe 7 entering the dissolver vessel. The lower end of pipe 5 may be tapered into a jet if desired. Liquid ammonia or other solvent medium is fed in through pipe or pipes 9 to fill the annular chamber 10 from which it overflows over wall 11 through opening 12, the wall 11 thus functioning as a weir. The solvent then flows down the inner walls of vessel 6 below point 12 and spreads over them as a substantially continuous film, thus keeping them free from incrustations or deposits of metal.

If the amount of solvent thus fed in is insufficient to dissolve the molten material completely or if the resulting solution requires dilution, further supplies of solvent may be fed into the reaction or solution vessel through an independent supply inlet (not shown).

The position of opening 12 relative to the lower end of pipe 5 may be chosen so that it is above the level where metal from the pipe tends to deposit in use. Usually it is adequate to position it slightly below the end of the pipe, though higher positions work satisfactorily. In a case such as this, in which the boiling point of the solvent liquid is below the solidifying or congealing point of the molten material, it is preferred to keep the solvent feed level as far as possible below the point at which the molten metal feed pipe 5 enters the top of vessel 6 so as to minimize the cooling effect of the solvent feed on the molten material. The two feeds can be positioned nearer to each other if some form of thermal insulation, for example an insulating gasket, is fitted in the body of the vessel 6 between the two feeds. It is not essential for the lower end 7 of the vessel 6 to be constricted, and indeed it is preferred that there should be as little constriction as possible so as to facilitate flow of materials through the vessel and the shape should facilitate as far as possible the flow of solvent down the walls and out through outlet 7; nevertheless, the actual size of the apparatus, and particularly of the connection pipe to the dissolver vessel, may be dictated to some extent by the materials available.

The apparatus may be made of any of the conventional materials appropriate to the chemicals to be handled and the conditions of use. Conveniently, stainless steel may be used to minimize corrosion risks. If desired part of vessel 6, particularly the upper part, may be made transparent (i.e. as a sightglass) to allow visual check of the flow of molten material. When using a material which is reactive towards air or atmospheric moisture, as in the case of an alkali metal the apparatus may also be provided with means (not shown) for purging with an inert gas, e.g. dry nitrogen.

In FIG. 2, the apparatus represented is a modification of that of FIG. 1 incorporating some optional features. The reference numerals have the same meaning as for FIG. 1. In this drawing, the inlet jet 5 is shown set in a flange 13 the upper part of the vessel 6A is a sight-glass tube, and the two are jointed together by way of a thermally insulating block or gasket 14. The lower end of the vessel, shown at 7 and connected to the wall of the dissolver vessel 8, may if desired have the alternative shape shown by the broken lines, as at 7A and 8A.

I claim:

1. Apparatus for dissolving a molten material in a solvent liquid which comprises, in combination, a dissolver vessel, an inlet device for feeding molten material into said vessel, said device including an essentially vertical feed pipe, a downwardly facing restricted exit aperture discharging into said vessel, means disposed below the upper end of said feed pipe for irrigating the lower portion of the internal walls of said pipe and aperture with said solvent liquid, means for feeding solvent liquid to said irrigating means, and a primary inlet pipe for feeding molten material to said feed pipe, said primary inlet pipe being of lesser cross section than said feed pipe and said aperture and having a downwardly facing discharge end terminating in said feed pipe above and coaxially with said aperture at a location above said irrigating means.